April 26, 1955

C. E. BANNISTER 2,707,008

TREE-HANDLING METHOD AND AIRBORNE APPARATUS

Filed Nov. 27, 1951

INVENTOR.
CLYDE E. BANNISTER
BY Willard D. Eakin
ATTORNEY

April 26, 1955

C. E. BANNISTER 2,707,008

TREE-HANDLING METHOD AND AIRBORNE APPARATUS

Filed Nov. 27, 1951

INVENTOR.
CLYDE E. BANNISTER
BY Willard D. Eakin

ATTORNEY

April 26, 1955

C. E. BANNISTER 2,707,008

TREE-HANDLING METHOD AND AIRBORNE APPARATUS

Filed Nov. 27, 1951

INVENTOR.
CLYDE E. BANNISTER
BY Willard D. Eakin

ATTORNEY

INVENTOR.
CLYDE E. BANNISTER
BY Willard D. Eakin
ATTORNEY

United States Patent Office 2,707,008
Patented Apr. 26, 1955

2,707,008

TREE-HANDLING METHOD AND AIRBORNE APPARATUS

Clyde E. Bannister, Houston, Tex.

Application November 27, 1951, Serial No. 258,442

18 Claims. (Cl. 144—309)

This invention relates to procedure and apparatus for cutting off and transporting trees, as in obtaining wood for the making of lumber or pulp.

It chief object is to make it commercially feasible to take selected trees from a forest, as in the case of widely scattered dead or diseased trees, without the expense of the usual logging operations such as the dragging of the logs, clearing of lanes, etc.

A more specific object is to provide for carrying out the whole operation from the air, as by the use of a helicopter, including the trimming, severing and transporting of the tree.

Figure 1:
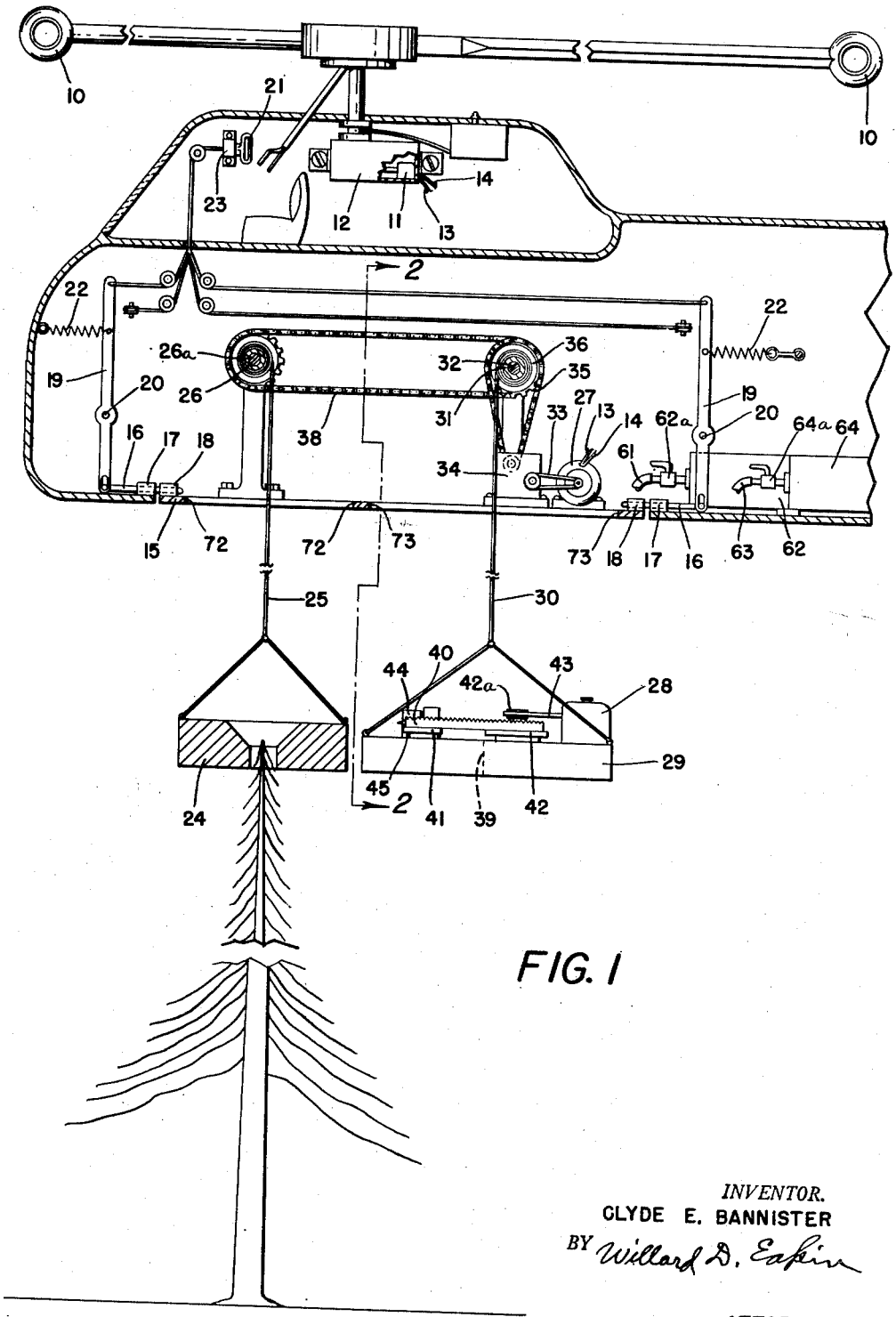
Fig. 1 is a diagrammatic elevation, with parts in section and parts broken away, of apparatus embodying and adapted for the practice of my invention in its preferred form, and of a tree in its relation to the apparatus at an early stage of the operation.
Figure 2:
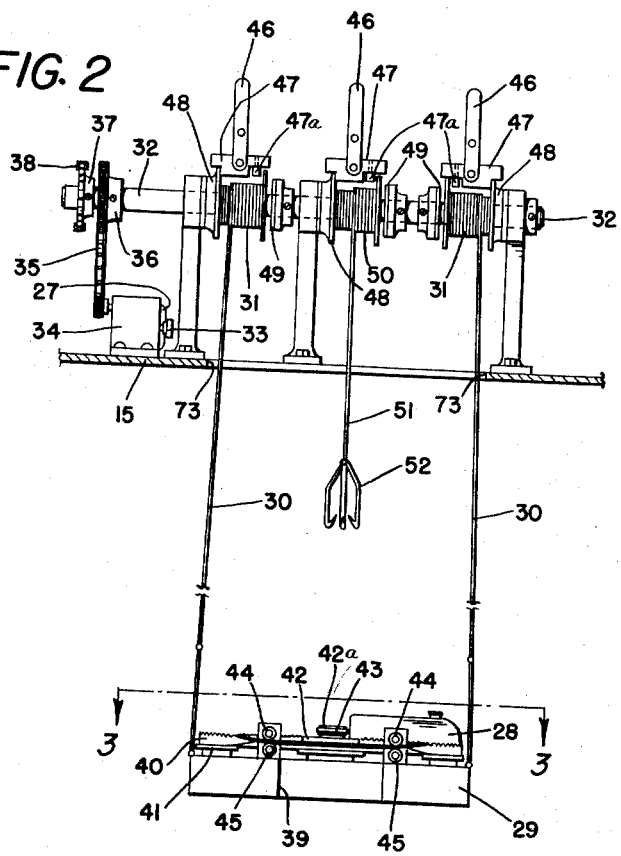
Fig. 2 is a section on line 2—2 of Fig. 1.

Referring first to Fig. 1, the helicopter preferably is of the type in which the motive power is supplied by ram-jet motors 10, 10 on the ends of the rotor blades. It is provided with an electric generator 11 mounted in a box 12, driven from the hub of the rotor and having conductors 13, 14.

The body of the helicopter has in its floor an opening in which is releasably supported a frame-like floor-panel 15 which is the mounting for the apparatus in which the principal features of the invention are embodied.

The invention is not limited to the mounting of such apparatus upon a releasable panel, but this arrangement is preferable for release and abandonment of the main parts of the apparatus in an emergency such as forest fire or bad entanglement of suspended devices with trees of the forest.

To permit the panel 15 to be released it is supported by latch pins 16, 16 slidably extending through loops 17, 17 and 18, 18, mounted in pairs upon the juxtaposed margins of the panel and the floor. The outer end of each latch pin 16 has pin-and-slot connection to the lower end of a lever 19 fulcrumed at 20 upon the helicopter body and having its upper arm connected by a cable, running over suitable guide pulleys, with a handle and stop member 21, within reach of the pilot. To prevent unintended withdrawal of the pins 16 from their loops, the upper arm of each lever 19 is connected by a pull spring 22 with the wall of the helicopter body and these springs normally hold the handle member 21 against a bracket 23, on a wall of the helicopter, as a stop.

In the apparatus shown in Fig. 1, the branches are broken from the tree as the first step of the operation, by dropping upon them, repeatedly if necessary, an annular weight 24, adapted to surround the trunk of the tree as it functions.

This weight 24 is secured upon the lower end of a cable 25, or a plurality of such cables, running on and from a windlass drum 26 mounted upon the panel 15, having suitable connections to be driven by a motor 27 mounted upon the panel, a suitable friction clutch and friction brake, such as those hereinafter described, being provided for the windlass drum 26.

For severing the tree from its stump, a band-saw assembly including a gasoline motor 28 is mounted upon a platform 29 which is suspended by cables 30, 30 running upon and from respective windlass drums 31, 31, which are loose journaled upon a shaft 32. For driving this shaft the shaft of the motor 27 is connected to it by a belt 33, speed reducer 34, chain 35 and sprocket 36. A sprocket 37, as a twin to the sprocket 36, has drive connection, through a chain 38, to the shaft 26ᵃ of the windlass drum 26 of the tree trimming device.

The platform 26 is formed with a guide notch 39, for guiding the platform onto the tree and for accommodating the tree as the band saw, 40, cuts through the tree.

Figure 3:
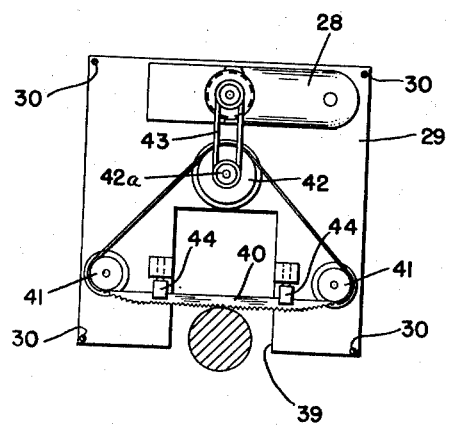
Fig. 3 is a section on line 3—3 of Fig. 2.

The band saw assembly comprises (Fig. 3) flanged idler guide pulleys 41, 41 and a flanged drive pulley 42 about which the band saw, 40, is trained, these pulleys being mounted on vertical axes upon the platform and the drive pulley 42 having a twin pulley 42ᵃ connected to the motor 28 by a belt 43.

For turning the band saw to, and holding it in, horizontal position, laterally, as it passes across the guide notch 39 of the platform, a pair of guide rolls 44, 45 are mounted, on horizontal stub shafts, at each side of the notch.

Each of the windlass drums 31 is axially slidable upon the shaft, by means of a lever 46 having on it a pivoted head 47. Movement of the head in one direction causes it, by engagement with the inner face of one of the drums flanges, to bring an end of the drum's hub against a non-rotatable friction brake element 48, and movement of the head 47 in the opposite direction brings the other end of the drum's hub, by pressure of an anti-friction roller 47ᵃ, into driving engagement with a friction clutch-plate 49 secured upon the shaft 32.

Likewise mounted upon the shaft 32, and provided with the same type of clutch and brake control, is a windlass drum 50 for manipulating a cable 51 having a three pronged grapple hook 52 on its lower end, for lifting and transporting the tree, the grapple being engageable with the tree before the latter is completely severed.

In the operation of the apparatus the helicopter hovers over the tree to be dealt with and the annular weight 24 is dropped one or more times on the tree, in encircling relation to it, to break off the tree's branches, for which this type of trimmer is adequate when the tree is dead and its branches are brittle.

The weight 24 is then lifted out of the way, after which the platform 29 is lowered and helicopter is moved forward to bring the notched platform 29 into straddling relation to the tree near the ground and to effect functioning of the band saw to cut off the tree, the motor 28 permissibly having been started before the lowering of the platform from the helicopter.

Before the tree is fully severed it is engaged by the grapple 52 and, upon its being fully severed, is thus transported to a suitable collecting point from which it, with other trees, can be economically transported elsewhere by other means.

Figure 5:
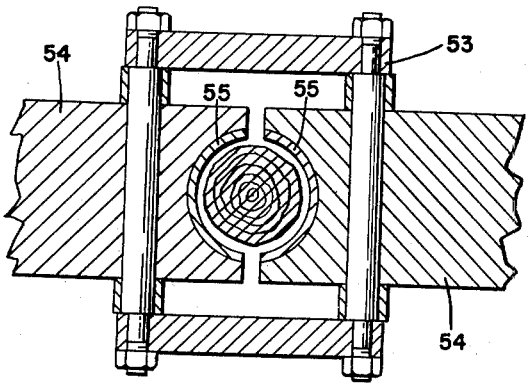
Fig. 5 is a section on line 5—5 of Fig. 4.
Figure 4:
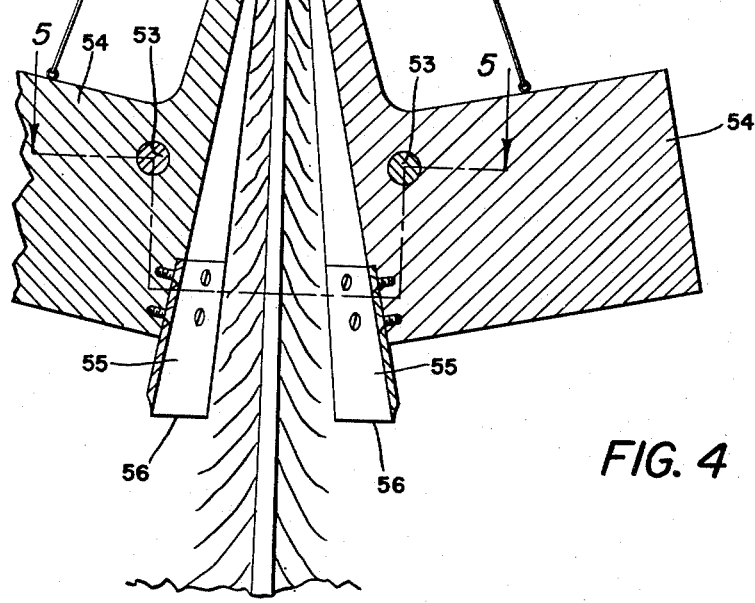
Fig. 4 is a vertical section of an alternative type of tree-trimming device.

The alternative tree trimming device shown in Figs. 4 and 5, which may be preferable for live trees, having less brittle branches, comprises a frame 53 on which are hinged on horizontal axes, a pair of weights 54, 54 formed with upwardly converging and then diverging, channel-shaped, cam-lever arms 54, 54. The device is suspended by cables attached to the weights and running to a windlass assembly such as that above described.

At its lower, inner part, each of the weights has secured to it a knife 55 having a downwardly facing, externally beveled, approximately semi-circular cutting edge 56.

This construction is such that when the device is lowered in encircling relation to the tree the knives are held spread apart by reason of the cables being attached to the weights at a suitable distance outward from the hinge axis of the weight, until the cam-lever arms 54 are spread apart by the top parts of the tree, or until a substantial part of the weight of the device is supported by contact of the cutting edges with branches of the tree. Then by one or both of those factors, with the weights having their centers of gravity outward from their hinge axes, the knives are caused to move into closer relation to the trunk of the tree and to cut the branches from it as the device is further lowered.

Figure 6:
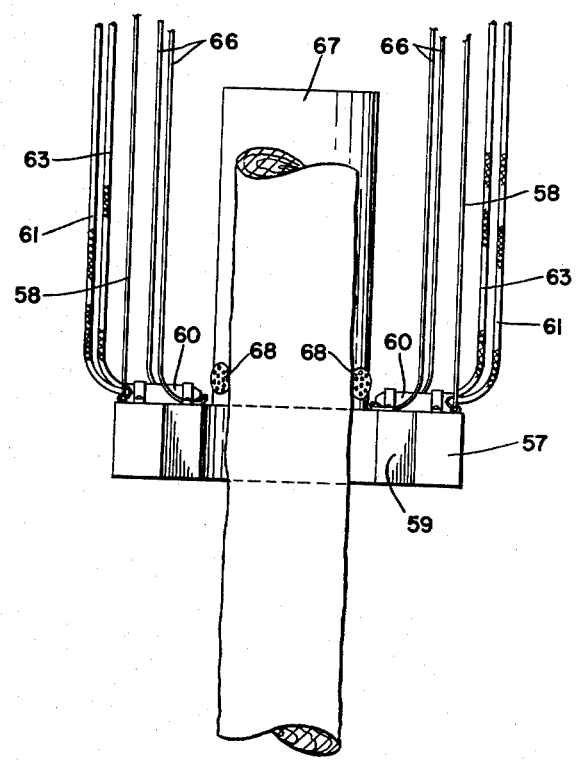
Fig. 6 is an elevation of an alternative type of tree-severing device, as viewed from the line 6—6 of Fig. 7.
Figure 7:
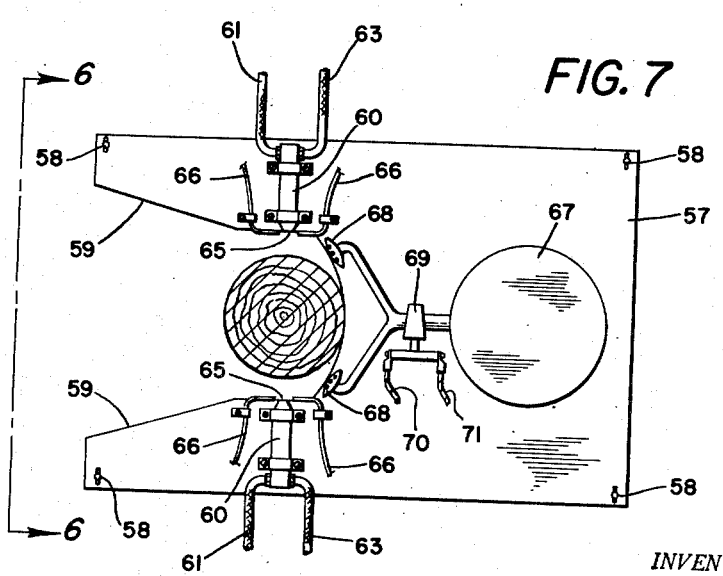
Fig. 7 is a plan view of the device shown in Fig. 6.

The alternative tree-severing device shown in Figs. 6 and 7 comprises a platform 57 lowered and raised by cables 58, 58 and formed with a tapered notch 59 for admission of the tree to its position for being severed by a pair of blow-torches 60, 60 mounted on the platform at opposite sides of the notch.

Each blow torch is provided with a hose 61 for conducting a gaseous fuel such as acetylene to it from a supply tank 62 mounted in the helicopter (Fig. 1), and having a stop-cock such as the one shown at $62^a$. Also each blow-torch is provided with a hose 63 for conducting oxygen to it from a supply tank 64 mounted in the helicopter and having a stop cock such as the one shown at $64^a$.

For lighting each blow-torch a spark gap is provided at 65 by a pair of electric wires 66, 66 extending from a source of electric current and a control switch (not shown) in the helicopter.

For stopping the burning of the stump, or of the partly severed tree if occasion arises, a water tank 67 is mounted on the platform 57 and provided with a pair of suitably placed spray-heads 68, 68, controlled by a stop-cock 69 having control cables 70, 71 extending to it from the helicopter.

The mode of operation of this severing device will be manifest from the foregoing description.

The floor panel 15, Fig. 1, preferably is formed with a forward opening 72 of size and shape suitable for it to accommodate and be closed by the tree-trimming device 24 or the one shown in Figs. 4 and 5. Likewise the floor panel preferably is formed with an opening 73 of size and shape suitable for it to accommodate and be closed by the platform 29 or 57.

In case the floor panel is released and thus dropped in an emergency, as above suggested, the windlasses and other equipment mounted upon it of course go along with it. The hoses 61, 63, if present, pull off of the stop-cocks, $62^a$, $64^a$. Breakage of the motor wires 13, 14, spark-gap wires 66, and stop-cock control cables 70, 71 can be relied upon for complete release of the suspended apparatus.

While all of the apparatus is here shown somewhat diagrammatically it is believed that the essentials will have been made manifest and that the procedure and apparatus disclosed can be used for attainment of the advantages that are set out in the above statement of objects.

I claim:

1. A tree-handling method which comprises severing the tree from its stump by remote control from a hovering aircraft and wholly by the use of severing means lowered from and controlled from the said aircraft and then wholly by the use of tree-engaging means lowered from and controlled from said air-craft for engaging the tree, conveying the tree as a load airborne by said aricraft.

2. A tree-handling method which comprises trimming the tree and severing it from its stump by remote control from a hovering aircraft and wholly by the use of trimming means and severing means lowered from and controlled from said aircraft and then, wholly by the use of tree-engaging means lowered from and controlled from said aircraft, conveying the tree as a load airborne by said aircraft.

3. A method as defined in claim 1 in which the tree is severed by sawing.

4. A method as defined in claim 1 in which the tree is severed by burning.

5. A method as defined in claim 2 in which the tree is trimmed by breaking its branches from its trunk.

6. A method as defined in claim 2 in which the tree is trimmed by cutting its branches from its trunk.

7. A method as defined in claim 2 in which the tree is trimmed by breaking its branches from its trunk with the force of gravity employed as the motive power for the breaking operation.

8. A method as defined in claim 2 in which the tree is trimmed by cutting its branches from its trunk with the force of gravity employed as the motive power for the cutting operation.

9. Tree-handling apparatus comprising an aircraft capable of hovering over the tree, a tree-severing device, means on and wholly controlled from said aircraft for lowering said device to its tree-severing position and for raising it therefrom, and means wholly controlled from said aircraft for manipulating said device in relation to the tree and causing it to sever the tree from its stump.

10. Tree-handling apparatus comprising an aircraft capable of hovering over the tree, a tree-severing device, means on and wholly controlled from said aircraft for lowering said device to its tree-severing position and for raising it therefrom, and tree-engaging means mounted upon and wholly controlled from said aircraft for supporting the tree from said aircraft for conveying the tree as an airborne load of the aircraft.

11. Tree-handling apparatus comprising an aircraft capable of hovering over the tree, a tree-trimming device and a tree-severing device, means on said aircraft for lowering said devices into operating relation to the tree and for lifting them therefrom, and means on said aircraft and wholly controlled therefrom for causing them to perform their respective operations upon the tree.

12. Apparatus as defined in claim 9 in which the recited severing device comprises a saw.

13. Apparatus as defined in claim 9 in which the recited severing device comprises means for burning the tree from its stump.

14. Apparatus as defined in claim 11 in which the recited trimming device comprises an annular weight adapted to be lowered in surrounding relation to the trunk of the tree and thus to break the branches therefrom by being impelled by the force of gravity.

15. Apparatus as defined in claim 11 in which the recited trimming device comprises a frame adapted to be lowered in surrounding relation to the trunk of the tree and downwardly facing cutting means mounted on said frame.

16. Apparatus as defined in claim 11 in which the recited trimming device comprises a frame adapted to be lowered in surrounding relation to the trunk of the tree and downwardly facing cutting means mounted on said frame, said cutting means comprising a plurality of arcuate knives and respective weights hinged on said frame and being the mountings for the knives respectively.

17. Apparatus as defined in claim 11 in which the recited trimming device comprises a frame adapted to be lowered in surrounding relation to the trunk of the tree and downwardly facing cutting means mounted on said frame, said cutting means comprising a plurality of arcuate knives and respective weights hinged on said frame and being the mountings for the knives respectively and said weights having respective cam arms actuated by contact with the tree for turning said weights on their respective axes and thus moving the knives toward the trunk of the tree.

18. Apparatus as defined in claim 9 in which the recited severing device comprises means for burning the tree from its stump, the apparatus including means associated with the burning means for terminating self-propagating burning of the stump of the tree.

References Cited in the file of this patent

UNITED STATES PATENTS

| Number | Name | Date |
|---|---|---|
| 337,018 | Rendall | Mar. 2, 1886 |
| 785,616 | Kaywood et al. | Mar. 21, 1905 |
| 850,848 | Pollard | Apr. 16, 1907 |
| 864,453 | Day | Aug. 27, 1907 |
| 1,313,709 | McKoy et al. | Aug. 19, 1919 |
| 1,342,213 | Hanson et al. | June 1, 1920 |
| 1,680,372 | Fenn | Aug. 14, 1928 |
| 1,946,390 | Christiansen | Feb. 6, 1934 |
| 2,477,922 | Emery et al. | Aug. 2, 1949 |
| 2,504,856 | Luplow | Apr. 18, 1950 |
| 2,534,595 | Hamilton | Dec. 19, 1950 |
| 2,542,952 | White | Feb. 20, 1951 |
| 2,583,971 | Shuff | Jan. 29, 1952 |

OTHER REFERENCES

"Aviation Week," Dec. 12, 1949, page 15.
"Aviation Week," Feb. 20, 1950, page 14.